United States Patent [19]

Kordahi

[11] Patent Number: 4,914,960
[45] Date of Patent: Apr. 10, 1990

[54] MULTI-ROLLER DYNAMOMETER AND TEST METHOD

[75] Inventor: Maurice E. Kordahi, Navesink, N.J.

[73] Assignees: American Telephone and Telegraph Company, New York, N.Y.; AT&T Bell Laboratories, Murray Hill, N.J.

[21] Appl. No.: 287,420

[22] Filed: Dec. 20, 1988

[51] Int. Cl.$^4$ .............................................. G01L 5/10
[52] U.S. Cl. ................................................ 73/862.48
[58] Field of Search ........... 73/862.48, 862.47, 862.44, 73/862.45; 254/273, 272

[56] References Cited

U.S. PATENT DOCUMENTS

| | | | |
|---|---|---|---|
| 2,444,245 | 6/1948 | Campbell | 73/862.45 |
| 3,204,454 | 9/1965 | Friman | 73/862.48 |
| 3,526,129 | 12/1967 | Anderson | 73/862.48 |
| 3,801,071 | 4/1974 | Barron | 254/273 |
| 4,213,596 | 7/1980 | Inoue et al. | 254/397 |
| 4,301,995 | 11/1981 | Niskin | 254/411 |
| 4,417,718 | 11/1983 | Niskin | 254/394 |
| 4,492,363 | 1/1985 | Niskin | 254/394 |
| 4,690,380 | 9/1987 | Niskin | 254/394 |
| 4,708,321 | 11/1987 | Niskin | 254/397 |

OTHER PUBLICATIONS

R. D. Ehrbar, "A Cable Laying Facility", BSTJ, Jul. 1964, pp. 1367-1372.
O. D. Grismore, "Cable and Repeater Handling System", BSTJ, Jul. 1964, pp. 1373-1394.
R. W. Gretter, "Cable Payout System", BSTJ, Jul. 1964, pp. 1395-1434.
"Pressure and Strain Measurement Handbook and Encyclopedia", OMEGA Engineering, Inc., 1985, pp. F-3, F-4, F-11, F-12, E-36, E-37, E-43 and E-44.

*Primary Examiner*—Charles A. Ruehl
*Attorney, Agent, or Firm*—Richard B. Havill

[57] ABSTRACT

In a dynamometer, a multi-roller sheave is positioned between a cable, or other elongate element, supply and the cable destination so that the cable rolls over the multi-roller sheave. The center axis of the cable changes direction from one side of the multi-roller sheave to the other side. Tension in the cable causes the multi-roller sheave to move and consequently stress a strain gauge. A signal produced by the strain gauge is amplified into a signal that accurately indicates the tension in the cable. Friction and wear between the cable and the dynamometer are eliminated for all practical purposes. Very accurate readings of tension are obtained.

7 Claims, 6 Drawing Sheets

MULTI-ROLLER DYNAMOMETER AND TEST METHOD

This invention relates to a dynamometer and a method of using the same.

BACKGROUND OF THE INVENTION

In the prior art used aboard an undersea cable laying and cable recovery ship, cable tension is measured during cable laying and cable recovery operations. Classically the cable slides over a friction plate of a dynamometer and deflects the cable path. A fraction of the tension is detected by the resulting movement of the friction plate and a strain gauge in a load cell. The signal representing that fraction of the tension is amplified into a signal representing the full magnitude of the tension.

The process of sliding the cable over the friction plate of a dynamometer is a source of error in the tension measurement. The metal friction plate provides a chute through which the cable slides. That plate wears as the cable slides through and is gouged and nicked as chains and fittings are handled. After these defects are incurred, the dynamometer produces erroneous tension readings because of slight changes in the cable deflection angle resulting from the wear and tear. Additional error in the tension reading is caused by the force of friction between the cable and the friction plate, as the cable slides over it. This force is greatly dependent upon the coefficient of friction between the cable and the friction plate. Error signals, arising from all of the aforementioned sources of error, are superimposed on the desired tension signal detected by the load cell. Together, all of these signals are amplified and applied to a readout device.

The resulting tension reading includes inaccuracies which are acceptable for undersea cables containing coaxial copper transmission media. Such inaccuracies are acceptable because copper is a malleable material that will stretch readily without breaking if a desired maximum tension is exceeded for brief periods.

Currently in undersea cables, optical fibers are being substituted for the coaxial copper transmission media. The optical fibers are much more fragile than the copper. Maximum allowable tension in the resulting optical fiber cable is critical because the optical fibers stretch very little without breaking. Acceptable error in tension readings on optical fiber cables is very low. Thus it is necessary to substantially reduce the sources of errors encountered when making tension measurements with a dynamometer.

SUMMARY OF THE INVENTION

This problem is solved by an improved dynamometer and a method of using that dynamometer. In the dynamometer, a multi-roller sheave is interposed between a cable supply and the cable destination so that the cable rolls over the multi-roller sheave. While the cable is rolling over the sheave, the center axis of the cable changes direction from one side of the multi-roller sheave to the other side. Tension in the cable produces a force against the sheave, causes the multi-roller sheave to move and strain a strain gauge. A signal produced by the strain gauge is amplified into a signal that accurately indicates the magnitude of tension in the cable.

The method includes the steps of (1) pulling the cable to roll over a multi-roller sheave so that the center axis of the cable changes direction from one side of the multi-roller sheave to the other side; (2) in response to the tension in the cable and change of direction of the center axis, moving the multi-roller sheave a distance related to the magnitude of the tension in the cable; (3) straining a strain gauge in proportion to the distance the multi-roller sheave moves; and (4) producing a signal proportional to the strain in the strain gauge for indicating the magnitude of tension in the cable.

Friction and wear between the optical fiber cable and the dynamometer are eliminated for all practical purposes. Very accurate readings of cable tension are obtained. The apparatus and method can be used for measuring tension during the manufacture or use of many other elongate items, e.g., lines, strings, ribbons, filaments, threads, strands, fibers, ropes, hoses, tubes, wires and others.

BRIEF DESCRIPTION OF THE DRAWING

A more complete understanding of the features and advantages of the invention can be gained by reading the following detailed description with reference to the drawing wherein.

DETAILED DESCRIPTION

Figure 1:
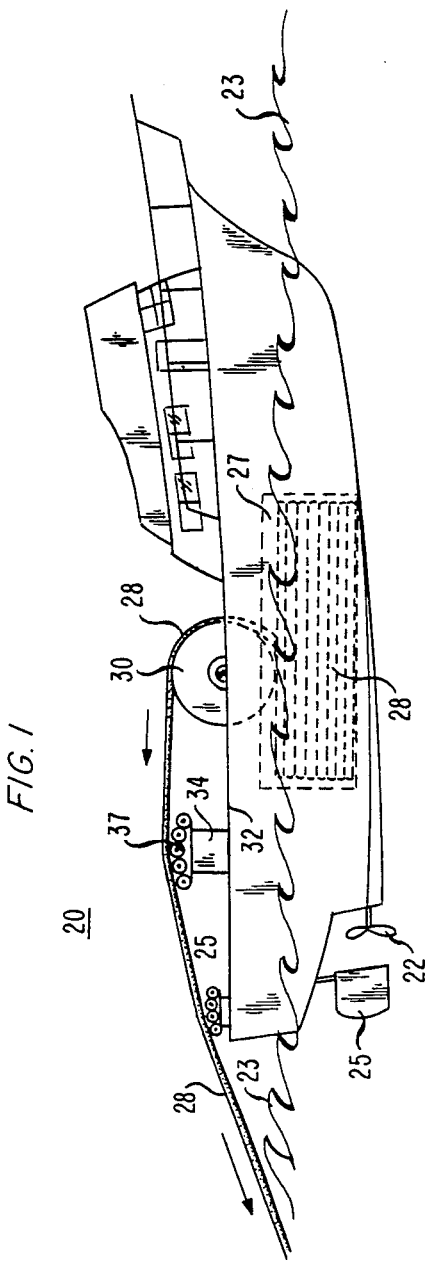
FIG. 1 is a diagrammatic sketch of the stern of a ship deploying undersea cable.

Referring now to FIG. 1, there is shown a diagram of the stern section 20 of an undersea cable laying ship. A propeller 22 provides thrust for moving the ship through ocean water 23. A rudder is positioned for steering. In the hold of the ship, there is an open tank 27 for storing a very long length of cable 28. The cable 28 is pulled up out of the tank 27, bent around a smooth guide surface 30, and moved toward the stern for deployment to the bottom of the ocean. There is a dynamometer 34 mounted on the ship deck 32 for determining the tension in the cable as it pays out of the hold and over a stern cable guide surface 35 into the ocean water 23.

As the propeller 22 moves the ship forward (to the right in FIG. 1), the cable 28 is pulled from the ship and is deployed to the bottom of the ocean. At the dynamometer 34, the cable 28 rolls over a multi-roller sheave 37 which is part of the dynamometer. As the cable is rolling over the multi-roller sheave 37, the cable bends and changes the direction of the center axis of the cable. This change of direction of the cable center axis produces a vertical, downwardly directed force on the dynamometer 34. That force is proportional to the force of tension in the cable 28. The dynamometer 34 is arranged to produce a signal accurately representing the magnitude of tension in the cable 28.

Although FIG. 1 shows only deployment of cable over the stern of a ship, deployment over the bow and recovery of cable over the stern or bow are accomplished with similar dynamometer arrangements. Details of the dynamometer 34, the multi-roller sheave 37 and the on-deck mounting arrangements thereof for FIG. 1 are presented in FIGS. 2, 3, 4, 5, and 6.

Figure 2:
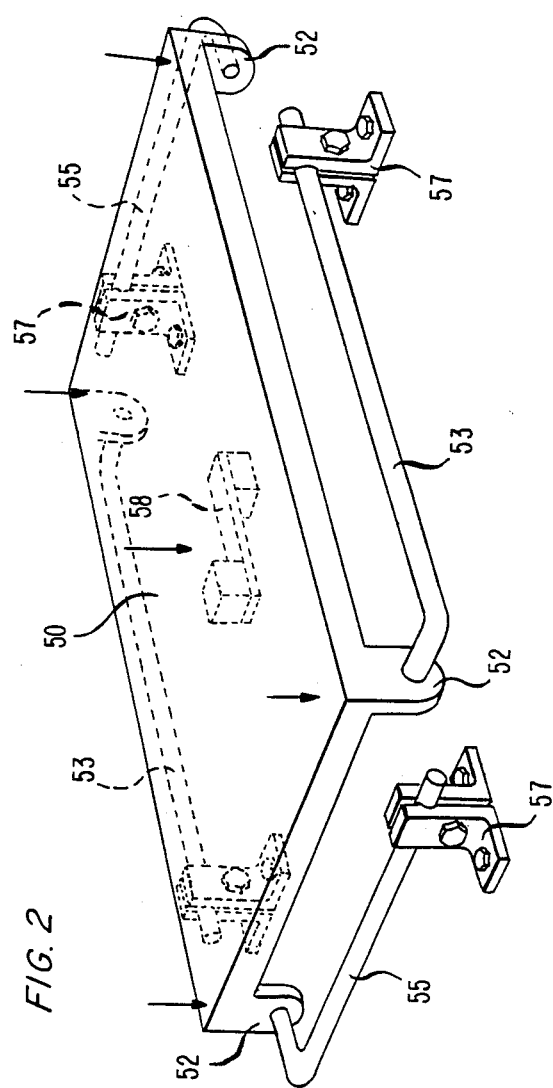
FIG. 2 is a perspective view of a spring mounted base plate upon which a multi-roller sheave can be mounted.

Referring now to FIG. 2, there is shown a solid steel base plate 50 with mounting brackets 52 affixed under each corner. The plate 50 forms a solid base for affixing the multi-roller sheave 37, which is shown in detail in FIG. 5. Two side cantilever rods 53 and two end cantilever rods 55 are fixed to the ship deck, or to a platform mounted to the deck, by brackets 57. The opposite ends of the cantilever rods 53 and 55 are inserted into the mounting brackets 52. A load cell 58 is interposed between the steel base plate 50 and the ship deck. A vertical force, imparted from the multi-roller sheave 37 of FIG. 5 to the steel base plate 50 of FIG. 2, is divided proportionally among the four cantilever rods and the load cell 58.

Figure 3:
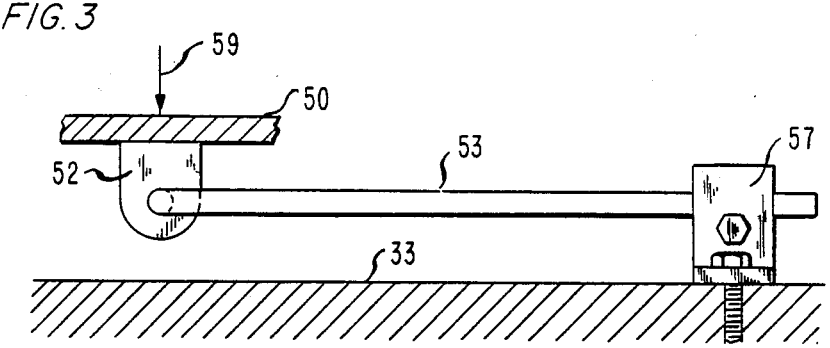
FIG. 3 is a sideview of a cantilever spring mounting arrangement for supporting a load.

FIG. 3 shows the arrangement of the cantilever rod 53 spring in a clearer sideview. At one end of the cantilever rod 53, it is inserted into the mounting bracket 52 that is affixed to the steel base plate 50. The other end of the cantilever rod 53 is held in the clamping bracket 57 which is fixed to the deck or platform 33. A force 59, one portion of the force created by the tension in the cable 28 of FIG. 1, is applied downward vertically so as to deflect the cantilever rod 53. The free end of the rod 53 deflects a vertical distance that is proportional to the magnitude of the force 59. There is very little vertical clearance between the bottom of the mounting bracket 52 and the deck or platform 33 to prevent excessive strain of the load cell which is shown in FIG. 2. Cantilever rod springs are used to provide side-to-side and end-to-end stiffening for preventing the base plate 50 and the multi-roller sheave from swaying in response to a misaligned cable rolling through the sheave, or to pitch and roll motion of the ship.

Figure 4:
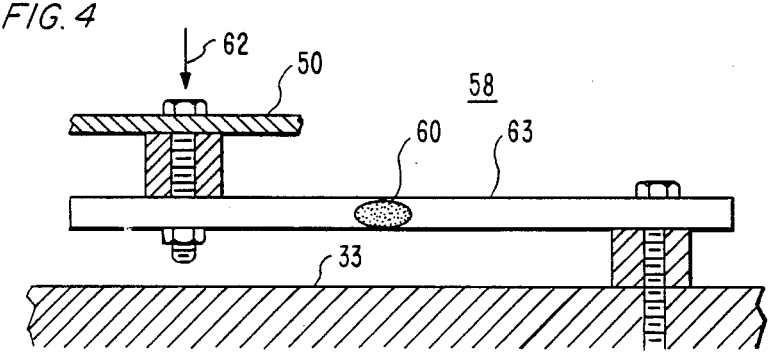
FIG. 4 is a sideview of a bending beam load cell for determining the magnitude of a force.

In FIG. 4 there are shown details of the bending beam load cell 58 which is mounted between the ship deck or platform 33 and the steel base plate 50. A package 60 containing a strain gauge, arranged in a Wheatstone bridge, is affixed to a flexible steel bar of the load cell 58. A downwardly directed force 62 represents a portion of the whole force from the multi-roller sheave 37 of FIG. 5. This portion of the force is applied to the bending beam load cell 58 for deflecting it. There is only a small vertical clearance between the bottom of the load cell 58 and the deck or platform 33 for preventing excessive strain of the load cell.

Figure 5:
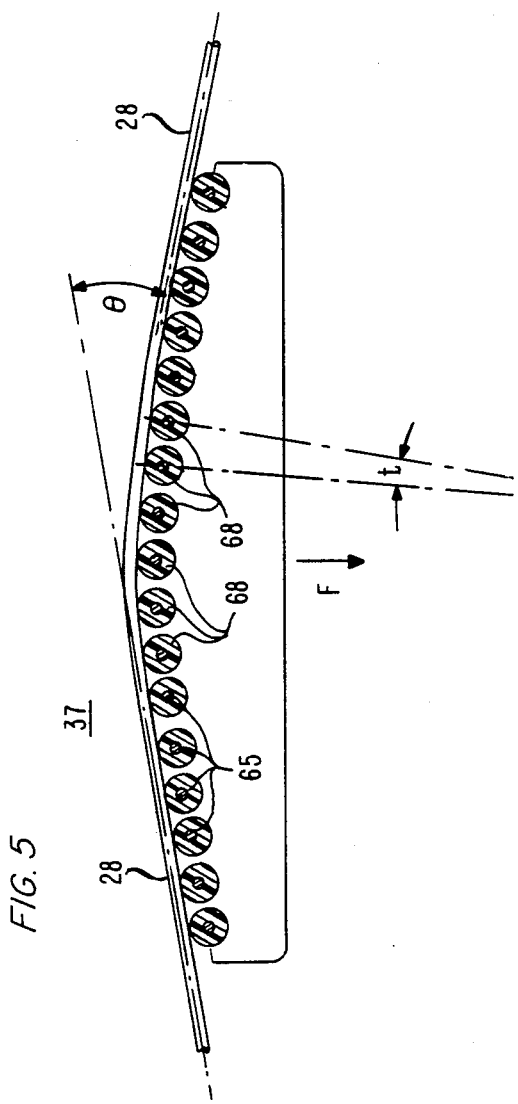
FIG. 5 is a sideview of a multi-roller sheave segment which can be mounted on the spring mounted base plate of FIG. 2.

Referring now to FIG. 5, there is shown a detailed sideview of the multi-roller sheave 37 of FIG. 1. In FIG. 5 the cable 28 bends over the sheave 37 so that the center axis of the cable changes direction by an angle $\theta$. The force F on the multi-roller sheave 37 is directly proportional to the tension T in the cable, as represented by the expression $$T = \frac{F}{2 \sin\left(\frac{\theta}{2}\right)}.$$

The axes 65 of several steel rollers 68 are positioned on the circumference of a circle with a very large radius $\rho$ relative to the diameters of the rollers. The cable passes over the rollers, which are free to rotate, reducing friction between the cable and the sheave to nil. Spacing between the rollers is chosen so that the cable 28 is constrained to a bending radius at all points along the multi-roller sheave 37 that exceeds the minimum bending radius for the cable. An arrow F, representing the force resulting from tension in the cable 28, is directed downward vertically toward the steel base plate 50 of FIG. 2.

Dimensions for the design of the multi-roller sheave 37 are governed by the following equation, which is derived by considering the sum of forces and the sum of moments that a bent cable is subjected to:

$$(EI)dR = T\frac{\sin t}{R} dt$$

$\rho$ = radius of curvature,
$R = 1/\rho$ = curvature,
$dR$ = the derivative of the curvature,
$t$ = angle between rollers,
$dt$ = the derivative of the angle between rollers,
$EI$ = cable bending stiffness
$T$ = cable tension.

In addition to the rollers 68, shown in FIG. 5, other rollers mounted on vertically oriented axes, not shown, may be installed along both sides of the sheave 37 to further reduce friction between the cable and the sheave. These rollers with the vertical axis are positioned for the same conditions as the rollers on the horizontal axes.

Figure 6:
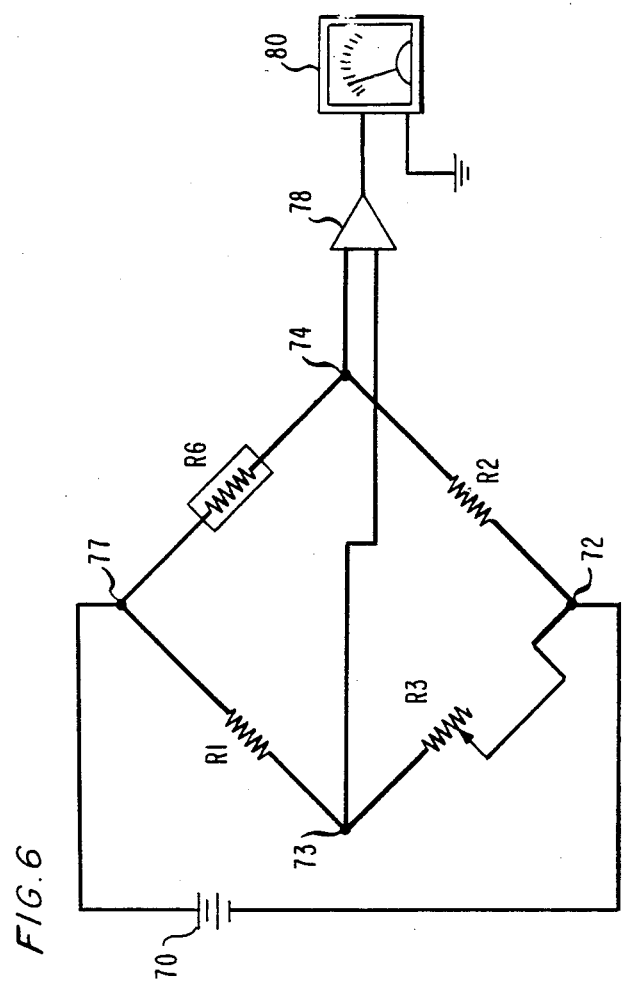
FIG. 6 is a schematic diagram of a Wheatstone bridge circuit of a load cell that produces an electrical signal which is proportional to a force.

FIG. 6 shows a Wheatstone bridge arrangement for detecting strain in the strain gauge which is fixed to the bending beam of the load cell 58 of FIG. 4. In FIG. 6 there are two fixed resistors R1 and R2, an adjustable resistor R3, and a strain gauge variable resistance RG. Those are configured in a classical bridge arrangement with a source of d.c. voltage 70 connected between two diagonally opposite nodes 71 and 72 of the bridge. Output voltage from the bridge is taken from nodes 73 and 74 and is amplified through an amplifier 78. The amplified output is applied to a meter 80 for indicating the magnitude of the bridge output which accurately represents strain in the strain gauge resistor RG and tension in the cable 28 of FIGS. 1 and 5.

Ideally the resistance of strain gauge resistor RG is the only resistance which varies in the bridge. The resistor RG should vary only in response to changes in the strain of the bending beam load cell 58 of FIG. 4. Initial balancing of the bridge is accomplished by adjusting the resistor R3 until the output voltage is zeroed. Thereafter readings on the meter 80 are directly related to changes in the strain of the strain gauge resistor RG and can be calibrated to represent the tension in the cable 28.

Additional details of the construction and operation of the load cell are presented in "Pressure and Strain Measurement Handbook and Encyclopedia", published by OMEGA Engineering Inc., dated 1985, pages F-3, F-4, F-11, F-12, E-36, E-37, E-43 and E-44.

Figure 7:
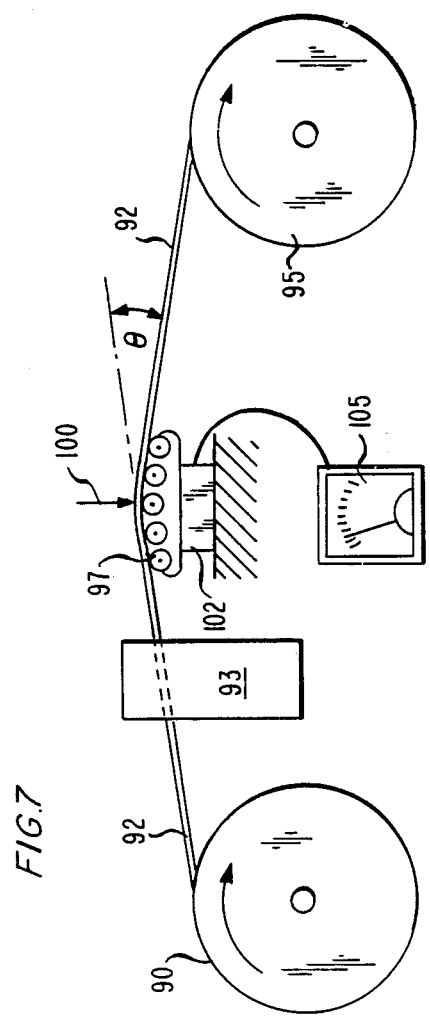
FIG. 7 is a diagrammatic sketch of an arrangement for bending an elongate element over a multi-roller sheave during a manufacturing process for the purpose of determining the tension in the elongate element.

Referring now to FIG. 7, there is shown a sketch of another embodiment of the invention. A source reel, drum, or spool 90 continuously supplies an elongate element 92, such as a filament, thread, fiber, string, stranded cable, rope, tube, hose, wire, line, ribbon, or optical fiber cable, for some purpose such as a manufacturing process, construction process, testing, or inspection. A block 93 represents the station or stations of a manufacturing or testing process along the path that the elongate element travels to a takeup reel 95. Along the way, the elongate element 92 rolls over a multi-roller sheave 97 where the center axis of the elongate element 92 changes direction, or is displaced, by a displacement angle $\theta$. Friction between the elongate element 92 and the multi-roller sheave 97 is negligible because the element rolls over the rollers. Tension in the elongate element 92 causes a force 100 which is directed vertically downward on the multi-roller sheave 97. A load cell 102 including a strain gauge is strained by the force 100 directly proportional to the tension in the elongate element 92. The load cell produces an output signal at a meter 105 in response to the strain of the load cell. That signal has a magnitude directly proportional to the magnitude of the tension in the elongate element 72. Error caused by the force of friction between the elongate element and the sheave 97 is negligible.

The foregoing describes some embodiments of the invention and the method for using the same. Those embodiments and the method together with other embodiments and methods made obvious in view thereof are considered to be within the scope of the appended claims.

I claim:

1. A method for measuring tension in an elongate element having a minimum radius of curvature, the method comprising the steps of:
    pulling the elongate element and rolling it over a multi-roller sheave designed to an expression $(EI)dR = T \sin t/R \, dt$, wherein
    $R = 1/\rho$ = curvature of the elongate element,
    $\rho$ = radius of curvature of the elongate element,
    $dR$ = the derivative of the curvature,
    $t$ = angle between rollers of the multi-roller sheave,
    $dt$ = the derivative of the angle between the rollers,
    $EI$ = bending stiffness of the elongate element, and
    $T$ = tension in the elongate element;
    at the multi-roller sheave, changing the direction of the center axis of the elongate element;
    in response to the change of direction and the tension, moving the multi-roller sheave a distance related to the magnitude of the tension in the elongate element;
    straining a strain gauge in proportion to the distance the multi-roller sheave moves; and
    indicating the magnitude of the tension in the elongate element in response to the strain in the strain gauge.

2. A method for measuring tension in an elongate element, the method comprising the steps of:
    pulling the elongate element and rolling it over a multi-roller sheave;
    at the multi-roller sheave, changing the direction of the center axis of the elongate element;
    in response to the change of direction and to the tension, moving the multi-roller sheave a distance related to the magnitude of the tension in the elongate element;
    straining a strain gauge in proportion to the distance related to the magnitude of the tension and indicating the magnitude of the tension in response to the strain in the strain gauge; and
    flexibly constraining side-to-side movement of the multi-roller sheave while dividing a force, caused by changing the direction of the center axis of the elongate element and by the tension in the elongate element, into parts proportional to the magnitude of the tension.

3. A method of measuring tension in an optical fiber cable having a minimum bending radius, the method comprising the steps of:
    pulling the optical fiber cable over a multi-roller sheave, wherein the rollers are optimally spaced on the circumference of a circle having a radius long enough so that when maximum allowable tension exists in the optical fiber cable, the minimum bending radius of the optical fiber cable is not violated, and changing the direction of the center axis of the optical fiber cable at the multi-roller sheave;
    moving the multi-roller sheave in response to the tension in the cable;
    stressing a strain gauge in response to movement of the multi-roller sheave; and
    indicating the magnitude of tension in the cable in response to stress in the strain gauge.

4. A method for measuring tension in an optical fiber cable, in accordance with claim 3, comprising the further step of:
    limiting friction between the optical fiber cable and the multi-roller sheave to a negligible magnitude over a range of tensions and of optical fiber cable speeds.

5. A method for measuring tension in an optical fiber cable, in accordance with claim 4, comprising the further step of:
    producing a magnitude of tension reading that excludes significant error caused by friction between the multi-roller sheave and the optical fiber cable.

6. A method for measuring tension in an optical fiber cable, in accordance with claim 5, comprising the further step of:
    by a set of spring mounts constraining side-to-side movement of the multi-roller sheave while dividing a force, caused by changing the direction of the center axis of the optical fiber cable and by the tension in the optical fiber cable, into parts proportional to the magnitude of the tension.

7. A method for measuring tension in an optical fiber cable, in accordance with claim 6, wherein the multi-roller sheave is designed to the expression
    $(EI)dR = T \sin t/R \, dt$, wherein
    $R = 1/\rho$ = curvature of the optical fiber cable,
    $\rho$ = radius of curvature of the optical fiber cable,
    $dR$ = the derivative of the curvature,
    $t$ = angle between rollers of the multi-roller sheave,
    $dt$ = the derivative of the angle between the rollers,
    $EI$ = bending stiffness of the optical fiber cable, and
    $T$ = tension in the optical fiber cable.

* * * * *